US009769990B2

United States Patent
Koizumi et al.

(10) Patent No.: US 9,769,990 B2
(45) Date of Patent: Sep. 26, 2017

(54) POWER TOOL

(71) Applicant: Hitachi Koki Co., Ltd., Tokyo (JP)

(72) Inventors: Toshiaki Koizumi, Hitachinaka (JP); Kazutaka Iwata, Hitachinaka (JP); Yasutaka Shimizu, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 216 days.

(21) Appl. No.: 14/439,324

(22) PCT Filed: Oct. 31, 2013

(86) PCT No.: PCT/JP2013/006469
§ 371 (c)(1),
(2) Date: Apr. 29, 2015

(87) PCT Pub. No.: WO2014/068987
PCT Pub. Date: May 8, 2014

(65) Prior Publication Data
US 2015/0289451 A1 Oct. 15, 2015

(30) Foreign Application Priority Data

Oct. 31, 2012 (JP) .................. 2012-240399

(51) Int. Cl.
*A01G 3/053* (2006.01)
*B25F 5/00* (2006.01)

(52) U.S. Cl.
CPC ............... *A01G 3/053* (2013.01); *B25F 5/00* (2013.01)

(58) Field of Classification Search
CPC ........................................ B25F 5/00

USPC ........................................ 318/3, 34
See application file for complete search history.

(56) References Cited

U.S. PATENT DOCUMENTS

| 4,459,522 A | * | 7/1984 | Huber | H01H 9/063 200/1 V |
| 6,104,155 A | * | 8/2000 | Rosa | H02P 3/06 318/245 |
| 6,448,727 B1 | * | 9/2002 | Rotterhusen | H02P 3/06 318/244 |
| 8,869,912 B2 | | 10/2014 | Roßkamp et al. | |
| 2010/0218967 A1 | | 9/2010 | Ro kamp et al. | |

(Continued)

FOREIGN PATENT DOCUMENTS

| CN | 1292864 A | 4/2001 |
| CN | 201393423 Y | 2/2010 |

(Continued)

OTHER PUBLICATIONS

China Intellectual Property Office office action for patent application CN201380056331.0 (Mar. 8, 2016).

(Continued)

*Primary Examiner* — David S Luo
(74) *Attorney, Agent, or Firm* — Kilpatrick Townsend & Stockton LLP

(57) ABSTRACT

A power tool includes: a power source (7); a tip tool (2); two switches (SW1,SW2); and a control unit (6e). The tip tool (2) is configured to be driven by the power source (7). The two switches (SW1,SW2) are configured to be turned on for activating the power source (7). The control unit (6e) is configured to control the power source (7) in accordance with on/off of the two switches (SW1,SW2), and operate if at least one of the two switches (SW1,SW2) is turned on.

15 Claims, 3 Drawing Sheets

(56) References Cited

U.S. PATENT DOCUMENTS

2010/0269355 A1  10/2010  Yang et al.
2012/0031635 A1   2/2012  Svennung et al.
2012/0249313 A1  10/2012  Valfridsson et al.

FOREIGN PATENT DOCUMENTS

| CN | 101876812 A | 11/2010 |
| CN | 201667853 U | 12/2010 |
| CN | 202310665 U |  7/2012 |
| DE | 102007060245 A1 | 6/2009 |
| EP | 2223780 A2 | 9/2010 |
| JP | 2002-172568 A | 6/2002 |

OTHER PUBLICATIONS

International Report on Patentability for application PCT/JP2013/006469 (May 14, 2015), 7 pages.
International Search Report for application PCT/JP2013/006469 (Feb. 13, 2014).

\* cited by examiner

[Fig. 1]
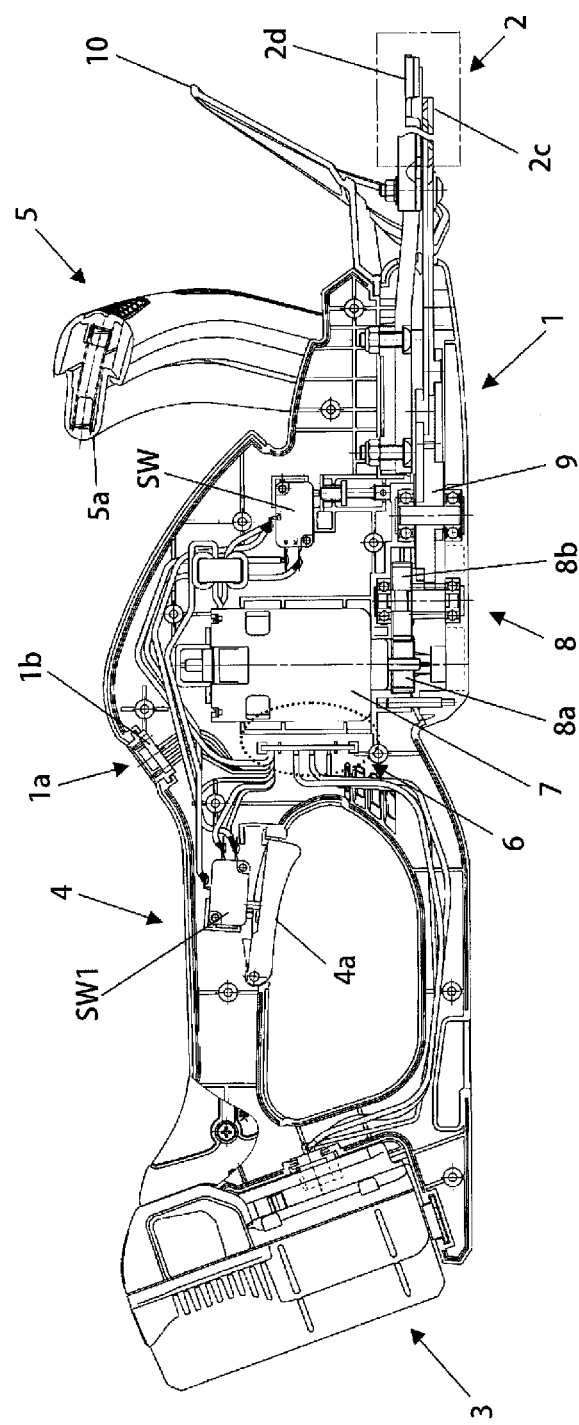

[Fig. 2]
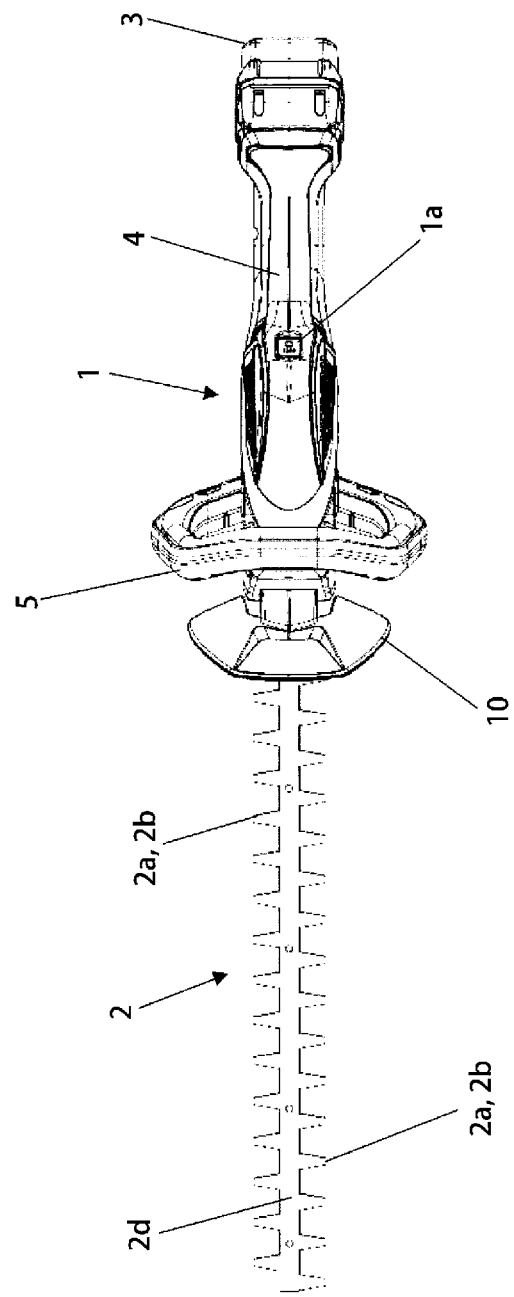

[Fig. 3]
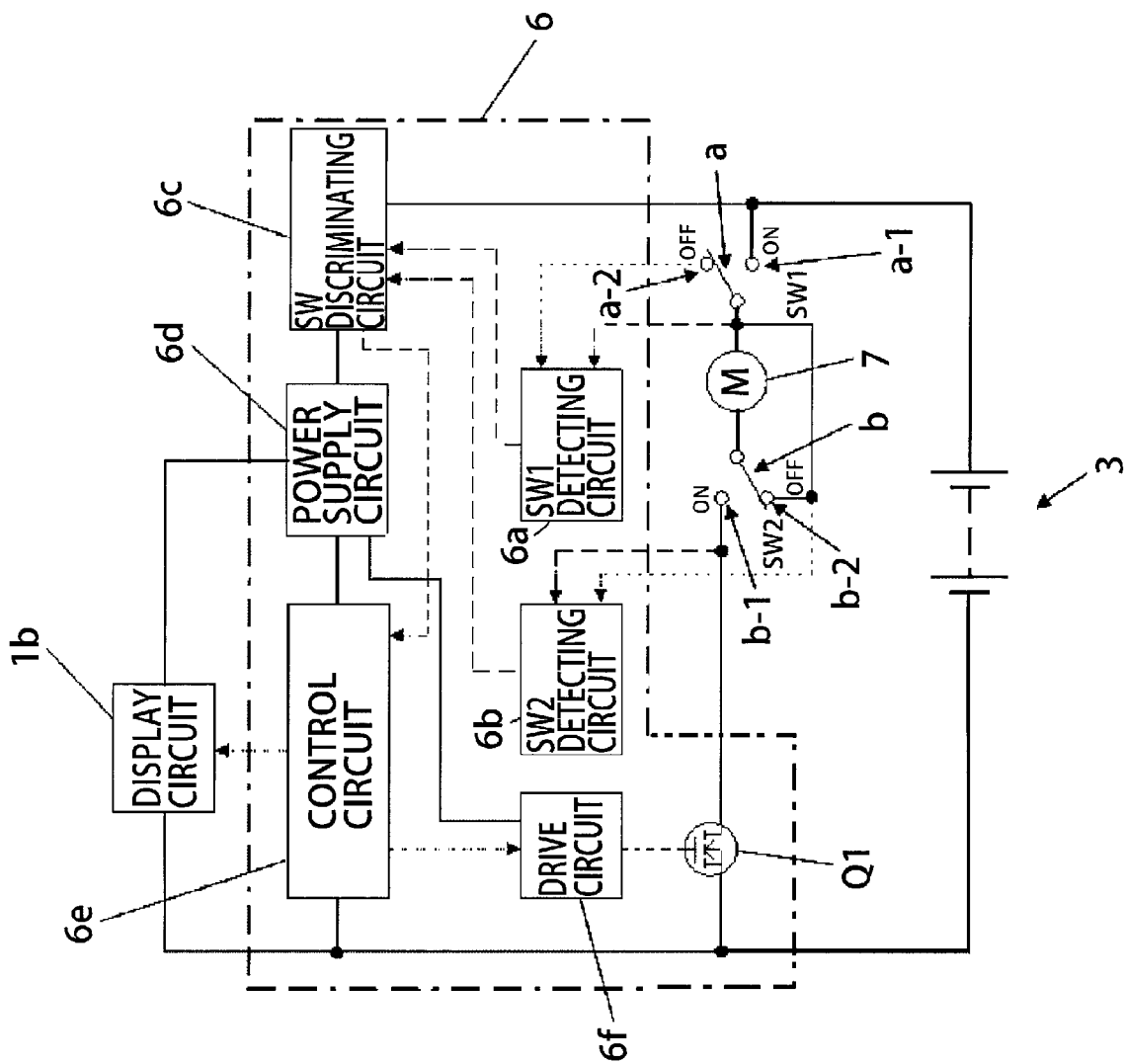

POWER TOOL

TECHNICAL FIELD

The invention relates to a power tool such as a hedge trimmer for use in pruning garden trees or trimming hedges.

BACKGROUND ART

Such a hedge trimmer as propose in Japanese Patent Application Publication No. 2002-172568 has hitherto been known as a power tool. The hedge trimmer comprises a housing, a motor, a main handle unit, a front handle, and two cutting blades (hereinafter called "blades"). The motor is incorporated in the main receptacle of the housing and receives electric power through a power-supply cord. The main handle unit is provided at the rear of the main receptacle. The blades are arranged in front of the main receptacle, and reciprocate in opposite directions through a drive mechanism that is driven by the motor.

The main handle unit and front handle have a main switch lever and a front switch lever each. If the user holds the main handle unit with one hand and the front handle with the other hand, and then turns on the both switch levers together, the motor drives the blades to reciprocate in opposite directions.

Thus, the motor is driven in the hedge trimmer only if both the switch levers are turned on, reciprocating the blades in opposite directions, thereby preventing the hedge trimmer from working in a wrong manner.

CITATION LIST

Patent Literature

Japanese Patent Application Publication No. 2002-172568

DISCLOSURE OF INVENTION

Solution to Problem

As described above, the motor is driven in the hedge trimmer disclosed in the above-stated patent literature, only if both the switch levers are turned on. This prevents the hedge trimmer from working in a wrong manner.

Such a hedge trimmer may have auxiliary functions such as a function of displaying switching in rotation speed, a function of displaying switching in a rotation direction, and a function of illumination by means of, for example, LED lamps. Further, any battery-driven hedge trimmers may have an auxiliary function of displaying the power remaining in the battery.

To activate the above-mentioned auxiliary functions, it may be necessary for the user to turn on the switch levers on both the main handle unit and front handle. In this case, the motor is driven, reciprocating the blades in opposite directions, even while the user is not trimming the hedge.

In this case, the user needs to confirm the switching in the rotation speed and rotation direction, while taking care not to make the blades touch the ground or the twigs and leaves near the hedge. In this respect, the hedge trimmer must be improved to be more user-friendly.

If the hedge trimmer has the auxiliary function of illumination by means of LED lamps, the light beam may extend in the lengthwise direction of the blades. The user must therefore be careful not to make the blades touch the ground or the twigs and leaves near the hedge, even while the user is not trimming the hedge.

In addition, to activate any one of the above-mentioned auxiliary functions, the user may turn on the switch lever for the function. In this case, it may happen that the user turns on the switch lever, while turning on the other switch lever for any other function remains turned on, too.

In this case, the motor may be driven, reciprocating the blades in opposite directions, even while the user is not trimming the hedge. The user must therefore be careful not to make the blades touch the ground or the twigs and leaves near the hedge. In this respect, again, the hedge trimmer must be improved to be more user-friendly.

In view of the foregoing, it is an object of the present invention to provide a power tool improved in user-friendliness.

The present invention features a power tool. The power tool includes: a power source; a tip tool; two switches; and a control unit. The tip tool is configured to be driven by the power source. The two switches are configured to be turned on for activating the power source. The control unit is configured to control the power source in accordance with on/off of the two switches. The power tool is characterized in that the control unit operates if at least one of the two switches is turned on.

Preferably, the power source is activated if both the two switches are turned on.

Preferably, the power tool has an auxiliary function configured to be activated by the control unit, and the auxiliary function is activated if at least one of the two switches is turned on.

Preferably, the auxiliary function is configured to display information of the power source.

Preferably, the auxiliary function is activated while the at least one of the two switches is turned on.

Preferably, the auxiliary function is deactivated upon lapse of a prescribed period of time after the at least one of the two switches is turned on or the auxiliary function is activated.

The present invention further features a power tool. The power tool includes: a blade assembly; a power source; two handles; and control means. The blade assembly has blades configured to reciprocate. The power source is configured to drive the blade assembly. In the two handles, one handle has a first switch and another handle having a second switch. The first switch or the second switch is turned on for activating an auxiliary unit configured to at least display information. The control means is configured to control the power source and the auxiliary unit in accordance with on/off of the first switch and the second switch. The power tool is characterized in that the control means activates the auxiliary unit if one of the first switch and the second switch is turned on.

Preferably, the control means is further configured to activate the power source in addition to the auxiliary unit if both the switches are turned on.

Preferably, the control means further includes: a control circuit; a power supply circuit; a first detecting circuit; a second detecting circuit; and a discriminating circuit. The control circuit is configured to control the auxiliary unit and the power source. The power supply circuit is configured to supply electric power to the control circuit. The first detecting circuit is configured to detect that one of the first switch and the second switch is turned on or off. The second detecting circuit is configured to detect that another one of the first switch and the second switch is turned on or off. The discriminating circuit is configured to discriminate whether or not at least one of the first switch and the second switch is turned on based on detection results of the first detecting circuit and the second detecting circuit and activate the power supply circuit if at least one of the first switch and the second switch is turned on. The control circuit is further configured to activate the auxiliary function if one of the switches is turned on, and to activate the power source in addition to the auxiliary unit if both the first switch and the second switch are turned on.

With this construction, if the one of the two switches is turned on, the auxiliary function is activated.

The auxiliary functions includes a function of displaying switching in rotation speed, a function of displaying switching in a rotation direction, and a function of illumination by means of LED lamps. Further, any battery-driven power tool may have an auxiliary function displaying the power remaining in the battery.

Advantageous Effects of Invention

In the power tool according to the present invention, the auxiliary function is activated if one of the two switches is turned on, and the power source is also activated if both the two switches are turned on. Therefore, the power tool is improved in user-friendliness.

BRIEF DESCRIPTION OF DRAWINGS

FIG. 1 is a cross-sectional view of a power tool according to embodiment of the present invention.
FIG. 2 is a plan view of the power tool shown in FIG. 1.
FIG. 3 is a diagram showing a control system of the power tool shown in FIGS. 1 and 2.

BEST MODE FOR CARRYING OUT THE INVENTION

A power tool according to embodiment of the present invention will be described while referring to FIGS. 1 to 3.

As shown in FIGS. 1 and 2, the power tool comprises a main body 1 and a blade assembly 2. The blade assembly 2 is a tip tool of the power tool.

A battery 3 is removably attached to the rear end of the main body 1. The battery 3 supplies electric power to a motor 7, which is a power source of the power tool. In this embodiment, the battery 3 is used as electric power supply of the power source. Nonetheless, the motor 7 may be driven by the electric power supplied through a power-supply cord, or an engine may be used for driving the motor 7.

A main handle 4 and a sub-handle 5 are provided on the main body 1. The main handle 4 extends in the lengthwise direction of the main body 1. The sub-handle 5 extends in a direction orthogonal to the lengthwise direction of the main body 1. A display unit 1a is provided in the upper part of the main body 1. The display unit 1a has a display circuit 1b and performs an auxiliary function of displaying information.

The display unit 1a is configured to display information about, for example, switching in rotation speed or a rotation direction. The power tool may have, if necessary, an auxiliary function of illumination by means of, for example, LED lamps. The power tool may have both an auxiliary function of display and an auxiliary function of illumination. In this case, the power tool may have a selection switch which selects, when operated, one or both of these auxiliary functions.

The main handle 4 and sub-handle 5 have a switch lever 4a and a switch lever 5a, respectively. The main handle 4 incorporates a micro-switch SW1, which is turned on or off as the switch lever 4a is operated. The main body 1 communicates with the inner space of the main handle 4. A control board 6 (encircled with the dotted line), a motor 7, and a reduction mechanism 8 are provided in the inner space of the main handle 4.

The control board 6 holds an SW1 detecting circuit 6a, an SW2 detecting circuit 6b, an SW discriminating circuit 6c, a power supply circuit 6d, a control circuit 6e, a drive circuit 6f and a switching element (MOSFET) Q1. These components will be later described in detail.

If the user turns on the switch lever 4a provided on the main handle 4 or the switch lever 5a provided on the sub-handle 5, the display unit 1a, which has the display circuit 1b, performs the auxiliary function of displaying information.

In addition, if the user turns on both the switch levers 4a and 5a provided respectively on the main handle 4 and sub-handle 5 while holding the main handle 4 with one hand and the sub-handle 5 with the other hand, not only the auxiliary function is performed, but also the motor 7 is driven with the electric power supplied from the battery 3 turned on by the control board 6 (later described in detail).

The reduction mechanism 8 has a reduction gear 8a and a transmission gear 8b. The reduction gear 8a is mounted on the output shaft of the motor 7. The transmission gear 8b meshes with the reduction gear 8a. An eccentric cam 9 is arranged beneath the transmission gear 8b. The eccentric cam 9 rotates as the reduction gear 8a rotates. If the drive force of the motor 7 is transmitted to the eccentric cam 9 via the reduction gear 8a and transmission gear 8b, the eccentric cam 9 rotates. The rotation of the eccentric cam 9 is transmitted to the blade assembly 2.

The blade assembly 2 comprises a blade holder 2c and a holder plate 2d. The blade holder 2c and holder plate 2d are formed in elongated shapes. An upper blade 2a and a lower blade 2b are arranged between the blade holder 2c and holder plate 2d.

If the rotation of the eccentric cam 9 is transmitted to the blade assembly 2, the upper blade 2a and lower blade 2b are driven back and forth. The power tool can therefore cut twigs and leaves, to trim the hedge.

A guard 10 is provided in front of the sub-handle 5. The guard 10 protects the user from the twigs and leaves the blades 2a and 2b have cut.

The power tool shown in FIGS. 1 and 2 has such a control system as shown in FIG. 3. In FIG. 3, the solid lines indicate electric power lines, and the dotted lines indicate control lines. As shown in FIG. 3, the micro-switch SW1, motor 7, micro-switch SW2 and switching element (MOSFET) Q1 are connected in series, and are connected in parallel to the battery 3.

The micro-switch SW1 is turned on or off as the switch lever 4a provided on the main handle 4 is operated. The micro-switch SW1 has a moving contact a, an on fixed contact a-1, and an off fixed contact a-2. If the switch lever 4a on the main handle 4 is turned on (that is, if the user pulls the switch lever 4a with a finger), the moving contact a contacts the on fixed contact a-1. If the switch lever 4a on the main handle is turned off (that is, if the user releases the switch lever 4a), the moving contact a contacts the off fixed contact a-2.

The micro-switch SW2 is turned on or off as the switch lever 5a provided on the sub-handle 5 is operated. The micro-switch SW2 has a moving contact b, an on fixed contact b-1, and an off fixed contact b-2. If the switch lever 5a on the sub-handle 5 is turned on (that is, if the user pulls the switch lever 5a with a finger), the moving contact b contacts the on fixed contact b-1. If the switch lever 5a on the sub-handle 5 is turned off (that is, if the user releases the switch lever 5a), the moving contact b contacts the off fixed contact b-2.

As described above, the control board 6 holds the SW1 detecting circuit 6a, SW2 detecting circuit 6b, SW2 detecting circuit 6b, SW discriminating circuit 6c, power supply circuit 6d, control circuit 6e, drive circuit 6f and switching element (MOSFET) Q1.

The SW1 detecting circuit 6a detects that the micro-switch SW1 is turned on or off. The SW2 detecting circuit 6b detects that the micro-switch SW2 is turned on or off. The SW discriminating circuit 6c determines whether the micro-switch SW1 and micro-switch SW2 are turned on or off, based on the detection results of the SW1 detecting circuit 6a and SW2 detecting circuit 6b. The SW discriminating circuit 6c then applies the voltage from the battery 3 to the power supply circuit 6d. The power supply circuit 6d performs DC/DC conversion on the electric power supplied from the SW discriminating circuit 6c, and functions as a control power supply, supplying power to the control circuit 6e, display circuit 1b and drive circuit 6f.

On receiving the electric power from the power supply circuit 6d, the control circuit 6e starts operating, and drives the display circuit 1b and drive circuit 6f in accordance with the discrimination result of the discriminating circuit 6c. That is, if the discriminating circuit 6c determines that either the micro-switch SW1 or the micro-switch SW2 is on, the control circuit 6e drives only the display circuit 1b.

Thus, if the switch lever 4a on the main handle 4 or the switch lever 5a on the sub-handle 5 is turned on, the display circuit 1b is driven. At this point, the display circuit 1b displays the information about, for example, the switching in the rotation speed and rotation direction, while the motor 7 remains not driven.

The control unit 6e drives not only the display circuit 1b, but also the drive circuit 6e, if the discriminating circuit 6c determines that both the micro-switch SW1 and micro-switch SW2 are on. The display circuit 1b may be driven while one of the micro-switches SW1 and SW2 or both are kept on. Alternatively, the display circuit 1b may be activated if one or both of the micro-switches SW1 and SW2 are turned on, and may then be automatically turned off upon lapse of a prescribed period of time (e.g., one minute).

If the drive circuit 6f turns on the switching element Q1 at this time instant, the power is supplied from the battery 3 to the motor 7. The motor 7 is thereby driven. Then, the output of the motor 7 is transmitted to the eccentric cam 9 via the reduction gear 8a and transmission gear 8b, the eccentric cam 9 rotates. The rotation of the eccentric cam 9 is transmitted to the blade assembly 2. The upper blade 2a and the lower blade 2b are thereby driven back and forth. The power tool can therefore cut twigs and leaves, to trim the hedge.

Thus, in this embodiment, if one of the switches (i.e., micro-switch SW1 or micro-switch SW2) is turned on, a control unit activates an auxiliary function. In addition, if both the switches (i.e., micro-switch SW1 or micro-switch SW2) are turned on, not only the auxiliary function is activated, but also the power source (i.e., motor 7) is driven.

The auxiliary function is, for example, a function of displaying information, such as the switching in rotation speed or a rotation direction. Further, the embodiment may perform an auxiliary function of illumination by means of, for example, LED lamps. Furthermore, the embodiment, which incorporates the battery 3, may perform an auxiliary function of displaying the power remaining in the battery 3.

According to the embodiment, the user only needs to turn on one of the switches (either micro-switch SW1 or micro-switch SW2) so as to make the power tool perform the auxiliary function. This can render the power tool more user-friendly.

The control means may have a control circuit (6e), a power supply circuit (6d), a first detecting circuit (SW1 detecting circuit 6a), a second detecting circuit (SW2 detecting circuit 6b), and a discriminating circuit (SW discriminating circuit 6c). The control circuit (6e) controls the display function (display circuit 1b) and/or illumination function (LED lights for applying light), and controls the power source (motor 7). The power supply circuit (6d) supplies electric power to the control circuit (6e). The first detecting circuit (SW1 detecting circuit 6a) detects that one switch (micro-switch SW1) is turned on or off. The second detecting circuit (SW2 detecting circuit 6b) detects that the other switch (micro-switch SW2) has been turned on or off. The discriminating circuit (SW discriminating circuit 6c) activates the power supply circuit (6d), upon detecting, based on the detection results of the first and second detecting circuits (SW1 detecting circuit 6a and SW2 detecting circuit 6b), that at least one of the switches (i.e., micro-switch SW1 or micro-switch SW2) is turned on.

In this case, the control circuit (6e) activates the display function (display circuit 1b) and/or the illumination function (LED lights for applying light) if the discriminating circuit (SW discriminating circuit 6c) discriminates that one of the switches (i.e., micro-switch SW1 or micro-switch SW2) is turned on. If the discriminating circuit (SW discriminating circuit 6c) discriminates that both the switches (i.e., micro-switch SW1 and micro-switch SW2) are turned on, the control circuit (6e) further activates the power source (motor 7).

While description has been made with respect to a hedge trimmer as one example of power tools, the present invention is also applicable to any tool that has two switches for driving the power source, such as a blower, a rotary saw and the like. Further, the power source may be an engine, not a motor.

REFERENCE SIGNS LIST

1 Main Body
1a Display Unit
1b Display Circuit
2 Blade Assembly
2a Upper Blade
2b Lower Blade
2c Blade Holder
2d Holder Plate
3 Battery
4 Main Handle
4a, 5a Switch Lever
5 Sub-handle
6 Control Board
6a SW1 Detecting Circuit
6b SW2 Detecting Circuit
6c SW Discriminating Circuit
6d Power Supply Circuit
6e Control Circuit
6f Drive Circuit
7 Motor
8 Reduction Mechanism 8a Reduction Gear
8b Transmission Gear
9 Eccentric Cam
10 Guard
Q1 Switching Element
SW1, SW2 Micro-switch

The invention claimed is:

1. A power tool comprising:
a power source;
a tip tool configured to be driven by the power source;
two switches configured to be turned on for activating the power source, the power source being activated if both the two switches are turned on; and
a control unit configured to
control the power source in accordance with on/off of the two switches, the control unit comprising:
a control circuit configured to control the power source;
a power supply circuit configured to supply electric power to the control circuit and
a detecting circuit configured to detect that one of the two switches is turned on or off,
wherein the control unit is configured to operate if at least one of the two switches is turned on.

2. The power tool according to claim 1, wherein the power source is activated if at least one of the two switches are turned on.

3. The power tool according to claim 2, having an auxiliary function configured to be activated by the control unit, wherein the auxiliary function is activated if at least one of the two switches is turned on.

4. The power tool according to claim 1, having an auxiliary function configured to be supplied electric power by the power supply circuit,
wherein the auxiliary function is activated if at least one of the two switches is turned on.

5. The power tool according to claim 4, wherein the auxiliary function is activated while the at least one of the two switches is turned on.

6. The power tool according to claim 4, wherein the auxiliary function is deactivated upon lapse of a prescribed period of time after the at least one of the two switches is turned on.

7. The power tool according to claim 4, wherein the auxiliary function is deactivated upon lapse of a prescribed period of time after the auxiliary function is activated.

8. The power tool according to claim 4, wherein the auxiliary function is configured to display information of the power source.

9. The power tool according to claim 8, wherein the auxiliary function is activated while the at least one of the two switches is turned on.

10. The power tool according to claim 8, wherein the auxiliary function is deactivated upon lapse of a prescribed period of time after the at least one of the two switches is turned on.

11. The power tool according to claim 8, wherein the auxiliary function is deactivated upon lapse of a prescribed period of time after the auxiliary function is activated.

12. A power tool comprising:
a blade assembly having blades configured to reciprocate;
a power source configured to drive the blade assembly;
two handles, one handle having a first switch and another handle having a second switch, the first switch or the second switch being turned on for activating an auxiliary unit configured to at least display information; and
a controller configured to:
control the power source and the auxiliary unit in accordance with on/off of the first switch and the second switch; and
activate the auxiliary unit if one of the first switch and the second switch is turned on.

13. The power tool according to claim 12, wherein the controller is further configured to activate the power source in addition to the auxiliary unit if both the switches are turned on.

14. The power tool according to claim 12, wherein the controller comprises:
a control circuit configured to control the auxiliary unit and the power source;
a power supply circuit configured to supply electric power to the control circuit;
a first detecting circuit configured to detect that one of the first switch and the second switch is turned on or off;
a second detecting circuit configured to detect that another one of the first switch and the second switch is turned on or off; and
a discriminating circuit configured to discriminate whether or not at least one of the first switch and the second switch is turned on based on detection results of the first detecting circuit and the second detecting circuit and activate the power supply circuit if at least one of the first switch and the second switch is turned on, and
wherein the control circuit is further configured to activate the auxiliary function if one of the switches is turned on, and to activate the power source in addition to the auxiliary unit if both the first switch and the second switch are turned on.

15. A power tool comprising:
a power source;
a tip tool configured to be driven by the power source;
two switches configured to be turned on for activating the power source;
an auxiliary function configured to display information of the power source; and
a control unit configured to:
control the power source in accordance with on/off of the two switches; and
activate the auxiliary function if at least one of the two switches is turned on.

* * * * *